US012520394B1

(12) United States Patent
Tasca

(10) Patent No.: US 12,520,394 B1
(45) Date of Patent: Jan. 6, 2026

(54) CALIBRATABLE LED SIMULATED DAYLIGHT SOURCE

(71) Applicant: John Tasca, Naples, FL (US)

(72) Inventor: John Tasca, Naples, FL (US)

(*) Notice: Subject to any disclaimer, the term of this patent is extended or adjusted under 35 U.S.C. 154(b) by 0 days.

(21) Appl. No.: 19/051,783

(22) Filed: Feb. 12, 2025

(51) Int. Cl.
H05B 45/10 (2020.01)
F21V 23/06 (2006.01)
H05B 45/20 (2020.01)
H05B 45/34 (2020.01)
H05B 45/345 (2020.01)
H05B 45/37 (2020.01)
H05B 47/155 (2020.01)
F21Y 115/10 (2016.01)

(52) U.S. Cl.
CPC ............ H05B 45/20 (2020.01); F21V 23/06 (2013.01); H05B 45/10 (2020.01); H05B 45/34 (2020.01); H05B 45/345 (2020.01); H05B 45/37 (2020.01); H05B 47/155 (2020.01); F21Y 2115/10 (2016.08)

(58) Field of Classification Search
CPC ........ H05B 45/20; H05B 45/10; H05B 45/34; H05B 45/345; H05B 45/37; H05B 47/155; F21V 23/06; F21Y 2115/10
See application file for complete search history.

(56) References Cited

U.S. PATENT DOCUMENTS

| | | | |
|---|---|---|---|
| 12,163,631 B1* | 12/2024 | Sadwick | ................ F21K 9/275 |
| 2014/0167645 A1* | 6/2014 | Takahashi | .............. H05B 45/20 315/297 |
| 2016/0186968 A1* | 6/2016 | Edwards | .................. F21K 9/64 362/84 |
| 2019/0320515 A1* | 10/2019 | Sadwick | ............. F21V 23/0471 |

* cited by examiner

Primary Examiner — Minh Tran
(74) Attorney, Agent, or Firm — The Rapacke Law Group, P.A.

(57) ABSTRACT

A lamp unit for a color matching apparatus can replace a conventional halogen lamp and blue filter with an LED lamp unit having a plurality of high-temperature output LEDs and a plurality of low-color temperature output LEDs, where at least the light output of the low-color temperature-rendering LEDs is adjustable to alter the resulting output color temperature.

11 Claims, 3 Drawing Sheets

CALIBRATABLE LED SIMULATED DAYLIGHT SOURCE

TECHNICAL FIELD

The embodiments generally relate to the field of light sources employed in industrial visual color matching to simulate daylight.

BACKGROUND

Simulated daylight artificial light sources are employed in industrial visual color matching to assure accuracy in colors applied to various subject articles. Such simulated daylight for industrial color matching is typically produced using blue tempered glass in front of a high wattage halogen lamp connected to a regulated power supply, with the glass color selected to filter the light generated by the halogen lamp to provide the desired color temperature of the light output. In a typical example of such a color matching apparatus, a color matching light booth employs a pair of 500 watt or 750 watt halogen lamps, each provided with a blue glass filter to provide the desired color temperature. Light booths employing this approach are made by Macbeth, Gretag, X-Rite, BYK, and GTI. As an alternative, replacement of halogen lamps with fluorescent lamps has been attempted.

SUMMARY

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

In general, the disclosed embodiments relate to an adjustable LED lamp unit that can be employed in place of a conventional halogen lamp to provide simulated daylight in a color matching apparatus such as a light booth. Disadvantages of prior art halogen lamps are high power consumption and heat generation, as well as variation in color due to inconsistency in glass color accuracy and/or variation in halogen lamp light output. Fluorescent lamps somewhat address the issues of power consumption and heat generation but tend to suffer from inaccuracy of color. By using highly-accurate, efficient, and consistent LEDs as the light source, lamp units such as escribed can overcome many of the deficiencies of halogen and fluorescent light sources for color matching.

An adjustable LED lamp unit can be designed for direct replacement of a halogen lamp and associated blue glass filter employed in a color matching apparatus such as a color matching booth. Such apparatus typically has at least one socket, having socket electrical connectors configured to hold and supply power to a halogen lamp. In a typical case, the apparatus is a color matching booth having a pair of sockets. The first socket may be utilized to supply power while a second socket may have a simulated load to simulate a lamp for electrical purposes.

The lamp unit can have a socket insert with insert electrical connectors, which is configured to insert into the socket in the same manner that the halogen lamp would. The insert electrical connectors can be configured to make contact with the socket electrical connectors when the socket insert is so inserted.

The lamp unit can have a plurality of high-color temperature-rendering LEDs and a plurality of low-color temperature-rendering LEDS mounted to one or more lamp panels via existing frames which held the blue conversion glass in place. An LED driver connects to the insert electrical connectors of the socket insert. The LED driver can energize the pluralities of LEDs when the lamp socket is energized to provide electrical power. The LED driver can power the plurality of low-color temperature-rendering LEDs in an adjustable manner so as to allow the light output from to be adjusted low-color temperature-rendering LEDs. Such adjustment could be provided by a dimmer control that controls the voltage and/or current that is provided to the low-temperature-rendering LEDs. The dimmer control could be manually adjusted and/or electronically adjusted. For example, if the low-color temperature-rendering LEDs are provided on an array intended to operate at a particular DC voltage, the dimmer control could supply variable DC voltage. The LED driver can power the plurality of high-color-temperature-rendering LEDs in such manner as to provide a constant light output, by providing a constant voltage and/or current.

In some embodiments, the user may utilize a spectral radiometer or a similar device to measure and adjust the LEDs.

The LEDs of the lamp unit can be selected such that the high-color temperature-rendering LEDs produce light at a color temperature of 6500K and the low-color temperature-rendering LEDs produce light at a color temperature of 3000-3200K. The ratio of high-color temperature-rendering LEDs to low-color temperature-rendering LEDs may be selected to be about 2.4:1, and could range from 1:1 to 4:1 and preferably about 4:1 to simulate daylight at about 6500 k. The LEDs may be arranged in strips, such as a configuration intended to replace a pair of halogen lamps, having 2 panels, each having 8 strips of 9 high-color temperature-rendering LEDs each and 2 strips of 15 low-color temperature-rendering LEDs. The LED strips could be configured such that the strips of low-color temperature-rendering LEDs are interleaved with the strips of the high-color temperature-rendering LEDs. Such panels could have dimensions of about 6.25"×6.25" (+/−0.25") to replace halogen lamps in the range of 500-750 watts employed in conventional color matching booths.

In some embodiments, the 6500 k strips are connected in series and the 3200 k strips are connected to parallel.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein.

DETAILED DESCRIPTION

Figure 1:
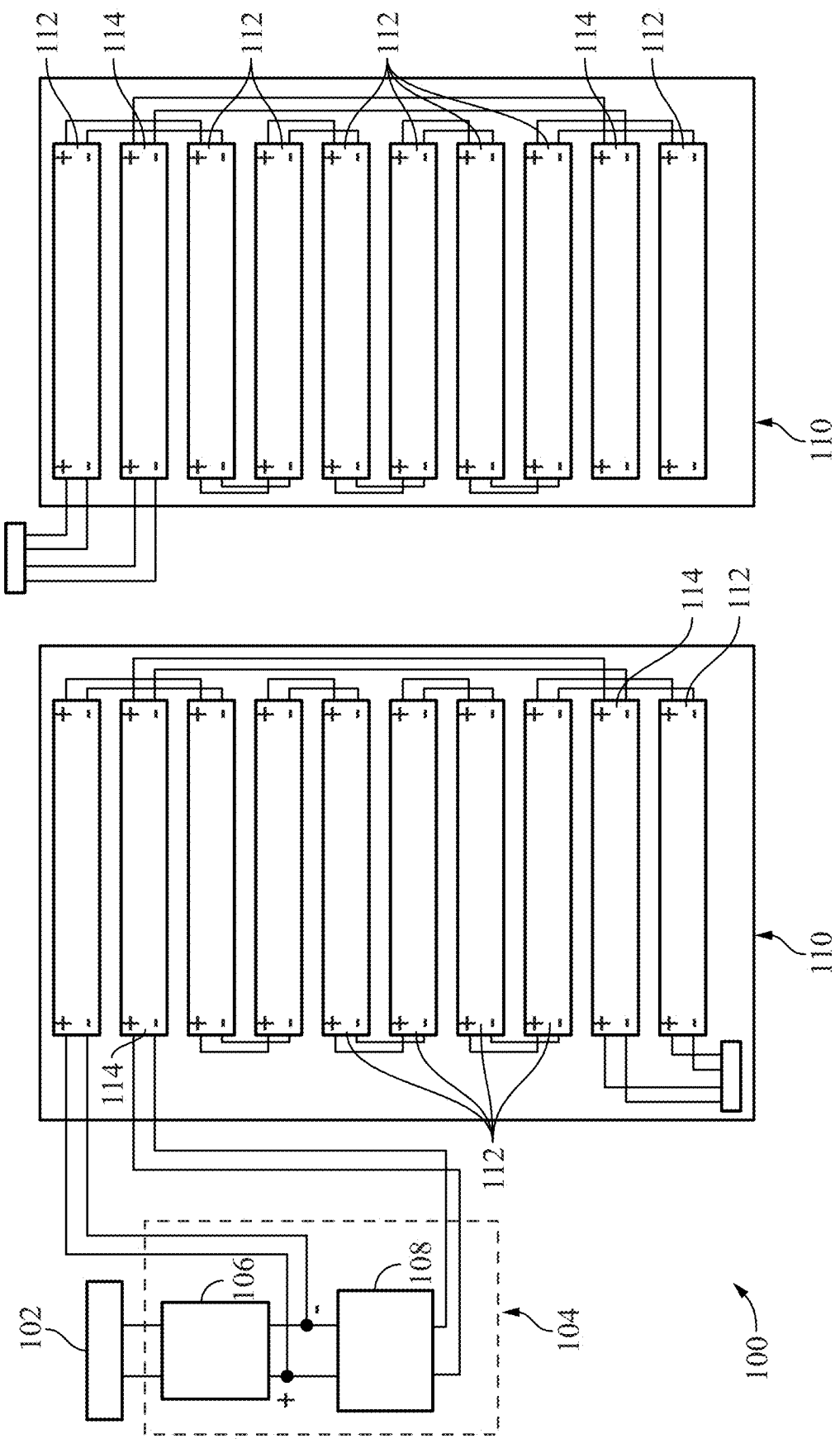
FIG. 1 is a schematic diagram illustrating an LED lamp unit, according to some embodiments disclosed herein.

The specific details of the single embodiment or variety of embodiments described herein are to the described product or methods of use. Any specific details of the embodiments are used for demonstration purposes only and no unnecessary limitations or inferences are to be understood from there.

It is noted that the embodiments reside primarily in combinations of components and procedures related to the products. Accordingly, the product and components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments described herein relate to a lamp unit intended to replace conventional halogen daylight color matching lamps employed in a lighting apparatus having at least one socket with socket electrical connectors for holding and energizing a halogen lamp.

Referring to the schematic diagram of FIG. 1, a lamp unit 100 is shown including a lamp insert 102 that is configured to insert into a socket of the lighting apparatus in place of the conventional halogen lamp. The lamp insert 102 can receive power from the socket to energize the lamp unit 100, and can communicate with an LED driver 104. In some embodiments, the LED driver 104 can consist of a constant voltage supply 106 and a variable voltage supply 108. In the LED driver 104 illustrated, the constant voltage supply 106 converts 120V AC received from the lamp socket and outputs 12V DC, while the variable voltage supply 108 receives 12V DC from the constant voltage supply 106 and outputs 0-12V DC, depending on its setting. Other power supply configurations could be used, matched to the needs of the particular LEDs employed.

One or more lamp panels 110 can be provided, each having a number of high-color-temperature-rendering LEDs contained in high-color temperature strips 112 and low-color temperature-rendering LEDs contained in low-color temperature strips 114. In the lamp panels 110 illustrated, each panel 110 has 8 high-color temperature strips 112 and 2 low-color temperature strips 114, each strip (112, 114) being designed to operate on 12V DC full power. The high-color temperature strips 112 are connected in parallel to the constant voltage supply 106, while the low-color temperature strips 114 are connected in parallel to the variable voltage supply 108. Thus, the high-color-temperature-rendering-LEDs 112 operate on a constant 12V DC supply voltage, while the low-color temperature-rendering-LEDs 114 operate on a voltage from 0-12V DC, as set by the variable voltage supply 108. In this manner, the light output of the low-color temperature-rendering-LEDs 114 can be adjusted to adjust the amount of low color temperature light emitted by the panels 110, and thus the overall color temperature produced by the panels 110 can be adjusted.

Figure 2:
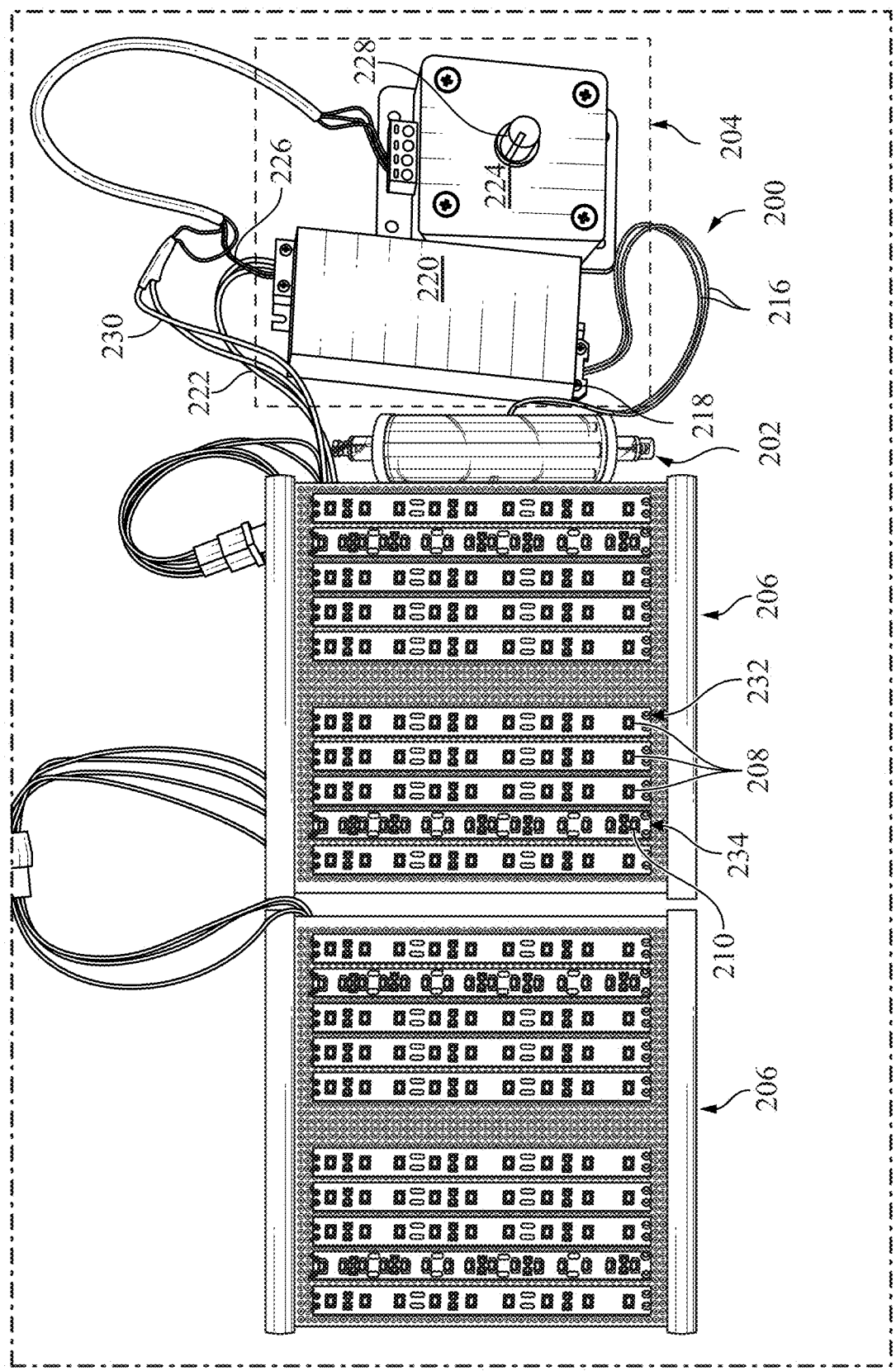
FIG. 2 illustrates a lamp unit similar to that shown in FIG. 1, according to some embodiments disclosed herein.
Figure 4:
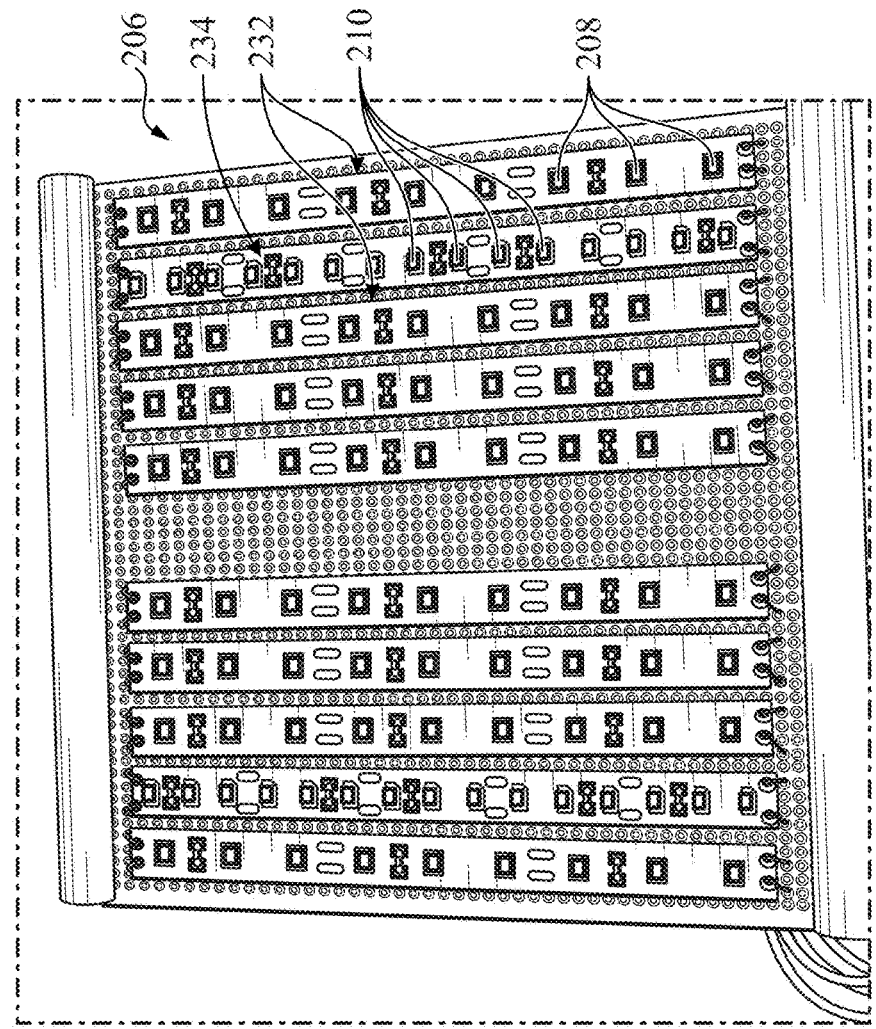
FIG. 4 illustrates a panel of the lamp unit shown in FIG. 2, according to some embodiments disclosed herein.
Figure 3:
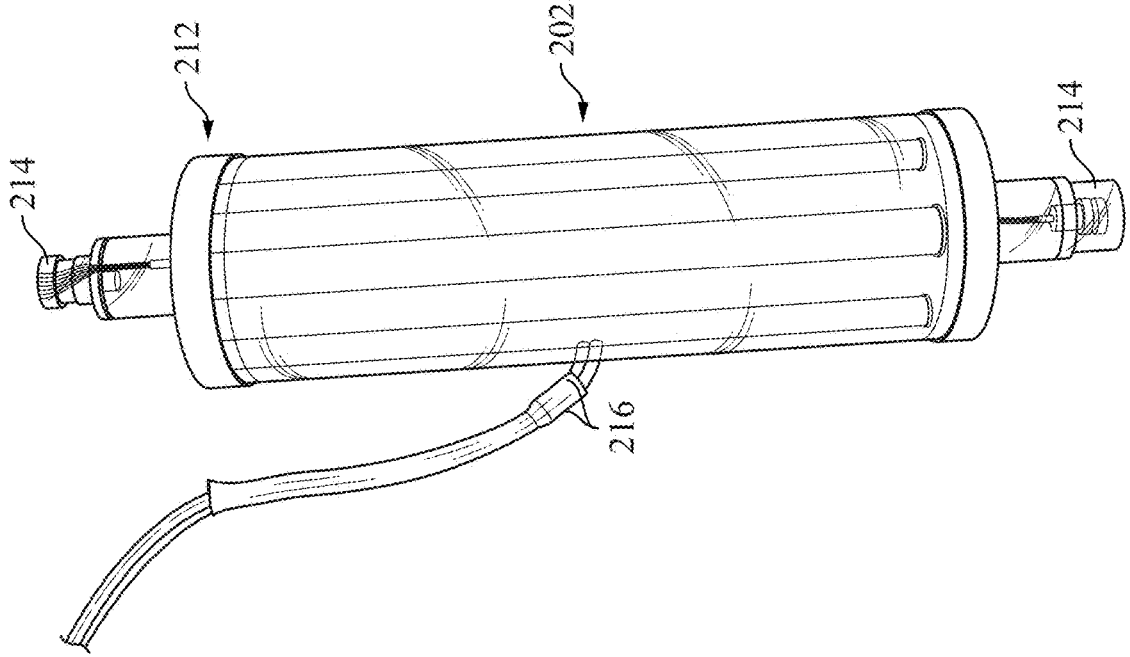
FIG. 3 illustrates a lamp insert of the lamp unit shown in FIG. 2, according to some embodiments disclosed herein.

FIGS. 2-4 illustrate one embodiment of a lamp unit 200 similar to that shown schematically in FIG. 1. The lamp unit 200 can have a lamp insert 202 (better shown in FIG. 3), an LED driver 204, and two panels 206 (one of which is better shown in FIG. 4), each having an array of high-color temperature-rendering-LEDs 208 and low-color temperature-rendering-LEDs 210.

Referring to FIG. 3, the lamp insert 202 can have an insert body 212 that terminates in end connectors 214 that serve as insert electrical connectors for engaging the socket electrical connectors of a conventional lamp socket designed to accept a conventional halogen lamp. Thus, the size and separation of the end connectors 214 is matched to the size and shape of a halogen lamp that the lamp unit 200 is to replace. AC power leads 216 connect to the end connectors 214 and in turn connect to AC inputs 218 of a constant voltage source 220 (shown in FIG. 2) that forms part of the LED driver 204. The constant voltage source 220 converts the received AC voltage to a constant DC voltage output, such as 12V DC. The constant DC voltage output is provided to the high-color temperature-rendering-LEDs 208 (connected in parallel) via high-temp supply wires 222, and to a variable voltage source 224 via constant supply wires 226. The variable voltage source 224 forms part of the LED driver 204, and outputs a variable DC voltage (such as from 0 to 12V), responsive to the setting of a control knob (i.e., a dimmer) 228. While illustrated as manually controlled by the knob 228, the variable output source 224 could be designed to adjust the output voltage electronically, such as in response to a remote controller, computer control, etc. The variable DC voltage is supplied via low-temp supply wires 230 to the low-temperature-rendering-LEDs 210 (connected in parallel). In some cases, one of the panels 206 may receive voltage through connections to the other panel 206, which in turn receives voltage from the LED driver 204.

Referring to FIG. 4, both the high-color temperature-rendering-LEDs 208 and the low-color temperature-rendering-LEDs 210 can be arranged in each panel 206 in strips 232, 234 that are design to operate at full brightness when supplied with 12V DC. When the lamp socket is energized (in response to a pre-existing conventional switch), the constant voltage source 220 provides 12V DC to the high-color temperature-rendering-LEDs 208, operating them at full brightness. The low color temperature-rendering-LEDs 210 are operated on the voltage supplied by the variable voltage supply 224, and thus may be operated at any voltage from 0V (at which they emit no light) up to 12V (full brightness). In this manner, the amount of overall light output of each panel 206 that is contributed by the low-color temperature-rendering-LEDs 210 varies, and can be adjusted to adjust the overall color temperature of the emitted light. The high-color temperature-rendering-LEDs 208 are selected to emit light at a color temperature close to that of daylight, such as 6500K, while the low-color temperature-rendering-LEDs 210 are selected to emit light at a much lower color temperature, such as 3000-3200K.

In the panel 206 illustrated, the high-color temperature-rendering-LEDs 208 are arranged in 8 strips 232, each having 9 high-color temperature-rendering-LEDs 208, while the low-color temperature-rendering-LEDs 210 are arranged in 2 strips 234 of 15 low color temperature-rendering-LEDs 210 each. This provides an overall ratio of high-color temperature-rendering-LEDs 208 to low-color temperature-rendering-LEDs 210 of 2.4:1 (a total in both panels 206 of 144 high-color temperature-rendering-LEDs 208 and 60 low-color temperature-rendering-LEDs 210).

Different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for anyone of the elements in the claims below or that a single element can be substituted for two or more elements in a claim. Although elements can be described above as acting in certain combinations, and even initially claimed as such, it is to be expressly understood that one or more elements from a claimed combination can, in some cases, be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible considering the above teachings without departing from the following claims.

What is claimed is:

1. A lamp unit for a color matching apparatus having at least one socket with socket electrical connectors, the lamp unit comprising:
   a socket insert configured to insert into the socket and having insert electrical connectors configured to make contact with the socket electrical connectors when said socket insert is so inserted;
   a plurality of high-color temperature-rendering LEDs;
   a plurality of low-color temperature-rendering LEDs; and
   an LED driver connecting to said insert electrical connectors and to said pluralities of LEDs to as to power said plurality of high-color-temperature-rendering LEDs and said plurality of low-color temperature-rendering LEDs,
   wherein said LED driver powers said plurality of low-color temperature-rendering LEDs in an adjustable manner so as to allow light output therefrom to be adjusted.

2. The lamp unit of claim 1, wherein said high-color temperature-rendering LEDs produce light at a color temperature of 6500K and said low-color temperature-rendering LEDs produce light at a color temperature of 3000-3200K such that a combination of the high-color temperature-rendering LEDs at 6500K and the low-color temperature-rendering LEDs at at a color temperature of 3000-3200K produce a color rendering index (CRI) of 99.

3. The lamp unit of claim 2, wherein said LED driver powers said plurality of high-color temperature-rendering LEDs in such manner as to provide a constant light output therefrom.

4. The lamp unit of claim 1, wherein a ratio of high-color temperature-rendering LEDs to low color temperature-rendering LEDs in said pluralities is between 2:1 and 3:1.

5. The lamp unit of claim 1, wherein said LED driver adjusts a voltage supplied to said plurality of low-color temperature-rendering LEDs.

6. The lamp unit of claim 5, wherein said low-color temperature LEDs are adjustable via a dimmer.

7. A lamp unit for a color matching apparatus having at least one socket with socket electrical connectors, the lamp unit comprising:
   a socket insert configured to insert into the socket and having insert electrical connectors configured to make contact with the socket electrical connectors when said socket insert is so inserted;
   a plurality of high-color temperature-rendering LEDs to produce light at a color temperature of about 6500 k;
   a plurality of low-color temperature-rendering LEDs to produce light at a color temperature between about 3000-3200 k; and
   an LED driver connecting to said insert electrical connectors and to said pluralities of LEDs to as to power said plurality of high-color temperature-rendering LEDs and said plurality of low-color temperature-rendering LEDs,
   wherein said LED driver powers said plurality of low-color temperature rendering LEDs in an adjustable manner so as to allow the light output therefrom to be adjusted.

8. The lamp unit of claim 7, wherein a ratio of high-color temperature-rendering LEDs to low color temperature-rendering LEDs in said pluralities is between 2:1 and 3:1.

9. The lamp unit of claim 8, wherein said LED driver powers said plurality of high-color temperature-rendering LEDs in such manner as to provide a constant light output therefrom.

10. The lamp unit of claim 9, wherein said LED driver adjusts a voltage supplied to said plurality of low-temperature-rendering LEDs.

11. The lamp unit of claim 10, wherein said low-temperature LEDs are adjustable via a dimmer.

* * * * *